United States Patent [19]

Ibrahim et al.

[11] Patent Number: 4,492,088
[45] Date of Patent: Jan. 8, 1985

[54] RADIATION SHIELD WITH HELICAL FLUID PASSAGES

[75] Inventors: El-Eraky A. Ibrahim, Monroeville; Phillip W. Eckels, Penn Hills, both of Pa.

[73] Assignee: Westinghouse Electric Corp., Pittsburgh, Pa.

[21] Appl. No.: 499,627

[22] Filed: May 31, 1983

[51] Int. Cl.³ .............................................. F17C 7/02
[52] U.S. Cl. ......................................... 62/55; 62/505; 62/514 R; 165/169; 310/64; 336/DIG. 1
[58] Field of Search ................... 310/10, 52, 40 R, 64; 336/DIG. 1; 165/169; 62/505, 55, 514 R

[56] References Cited

U.S. PATENT DOCUMENTS

| | | | |
|---|---|---|---|
| 2,559,272 | 7/1951 | Beck | 165/169 |
| 2,626,130 | 1/1953 | Raskin | 165/169 |
| 4,250,418 | 2/1981 | Eckels | 310/64 |
| 4,319,149 | 3/1982 | Eckels | 310/52 |
| 4,356,700 | 11/1982 | Eckels et al. | 310/64 |
| 4,386,289 | 5/1983 | Intichar et al. | 310/64 |

Primary Examiner—Ronald C. Capossela
Attorney, Agent, or Firm—William D. Lanyi

[57] ABSTRACT

A radiation heat shield which comprises a plurality of helical grooves distributes possible thermal expansions around its circumference. These potential thermal expansions could be caused by transient conditions or other abnormal operational modes which could reduce the flow of coolant through particular fluid passages of the radiation shield. By incorporating a plurality of helical fluid passages, these potential thermal expansions are distributed around the circumference of the radiation shield and the resulting distortion moments tend to cancel each other and, provided that a sufficient number of turns is possible, eliminate the imbalance.

13 Claims, 6 Drawing Figures

RADIATION SHIELD WITH HELICAL FLUID PASSAGES

BACKGROUND AND SUMMARY OF THE INVENTION

The present invention relates generally to a superconducting generator and, more particularly, to a radiation shield for use with a supercooled rotor.

Superconducting generators typically employ a supercooled rotor which incorporates a superconducting field winding and a rotor structure to support that winding. A fluid refrigerant is used to supercool the field winding to a cryogenic temperature. In typical applications, this refrigerant is helium. The rotor assembly of a superconducting generator also incorporates a pair of torque tubes connected to opposite axial ends of the rotor support structure, a torque tube heat exchanger which is cooperatively associated with each of the torque tubes and a thermal radiation shield which is cylindrically disposed around the field winding portions of the superconducting generator rotor.

When a superconducting generator is in normal operation, a liquid coolant, such as helium, which is contained within a pool near the center of the rotor is converted to a gaseous state through boil-off at a relatively low, but constant, rate. The gaseous coolant is directed toward and along the length of each torque tube by the torque tube's associated heat exchanger. The primary function of the torque tubes is to transmit torque from a prime mover, which is generally at room temperature, to the winding support structure of the superconducting rotor which is at liquid helium temperatures of approximately 4° Kelvin. Also, these torque tubes limit thermal stresses as well as heat leakage which could result due to severe temperature gradients.

The primary function of the radiation shield of a superconducting generator is to intercept heat that is radiated from the rotor's ambient surroundings which are typically at room temperature. The purpose of the radiation shield is to prevent this radiated heat from increasing the temperature of the cryogenic cold zone within the supercooled rotor. In order for the radiation shield to properly inercept the radiated heat from ambient surroundings and remove it from the vicinity of the supercooled field windings, the radiation shield itself must be cooled. However, a properly functioning radiation shield can operate at temperatures which are approximately 100° Kelvin whereas the supercooled field windings themselves must be maintained at a temperature of approximately 4° Kelvin which is below its critical temperature. In order to provide for the supercooling of the radiation shield, a plurality of fluid passages are incorporated within the body of the radiation shield and generally continuous streams of gaseous helium are transported through these fluid passages. U.S. Pat. No. 4,250,418 which issued to Eckels on Feb. 10, 1981 discloses a radiation shield which is used to protect the cold zone of a supercooled rotor from externally radiated heat and is also used to maintain the temperature of the fluid coolant during fault conditions. U.S. Pat. No. 4,319,149 which issued to Eckels on Mar. 9, 1982 discloses a radiation shield which exhibits an improved thermal transient response by including risers disposed within the flow path proximate the discharge end of the fluid passages. The fluid passages of radiation shields are usually provided by a series of grooves in one of two cylinders which are tightly assembled together in coaxial and concentric association.

When a superconducting generator is intended to be used in power plant applications, its design must enable it to survive the most severe operating conditions of such a system which includes a three-phase high voltage transmission line fault. During this type of fault, electromagnetic losses occur in the rotor's field winding, radiation shield and rotor support structure. As a result of these electromagnetic losses, liquid helium within the superconducting rotor is boiled off at a substantially increased rate and the flow rate of helium gas through the torque tube heat exchangers increases substantially and their temperature drops significantly.

During transient faults or other abnormal operating conditions, the flow of helium through the fluid passages of a radiation shield can be sufficiently disturbed so as to cause certain ones of these fluid passages to conduct the gaseous coolant at rates which differ significantly from that of other fluid passages within the radiation shield. Naturally, the portions of the radiation shield which are most proximate these affected fluid passages will be most severely affected by the temperature changes of those passages. In the event that certain passages experience a drastic decrease in coolant flow through them, the radiation shield material surrounding those deprived fluid passages will experience a temperature increase. Conversely, if certain fluid passages within a radiation shield experience an increased flow of coolant through them, the material most proximate those passages will experience a temperature decrease. Under certain contemplated fault conditions and some anticipated steady operating conditions, a combination of both of these deleterious circumstances is possible. Therefore, one portion of the radiation shield can experience an abnormally high temperature while another portion of that radiation shield can simultaneously experience an abnormally low temperature.

As two portions of a radiation shield are experiencing opposing temperature deviations, their respective regions will be thermally affected in such a way so as to cause expansions and contractions of material that can easily cause a significant imbalance in the cylindrical radiation shield. Since typical designs of radiation shields incorporate a plurality of straight and axially extending fluid passageways, a deviation in flow within a specific passageway will affect the material along its path and this affected region will essentially be a strip of material, extending axially from one end of the radiation shield to the other, which is generally straight and parallel to the central axis of the radiation heat shield. This deviation, caused by either an expansion or contraction of material or a combination thereof, will produce an imbalance in a rotating radiation shield and the actual effect of this imbalance will be determined by the distance of this distortion from the center of rotation of the radiation shield. It should be apparent that a combination of an expansion of one portion of a radiation shield along with the contraction of a diametrically opposite portion of the radiation shield could combine to produce a severe distortion and an imbalance of the radiation shield.

The present invention incorporates helical fluid passages extending from one axial end of the radiation shield to the other. These helical fluid passages connect circumferential fluid passages which are located at each axial end of the radiation heat shield. As the helical fluid passages connect and provide fluid communication between the circumferential fluid passages which are at opposite ends of the radiation heat shield, they traverse a helical path which extends around the circumference of the radiation heat shield a preselected number of times. The present invention incorporates a plurality of helical fluid passages which are segregated into subgroups. A radiation shield made in accordance with the present invention typically incorporates four subgroups and each subgroup is associated with an individual circumferential groove at each axial end of the radiation shield. Each subgroup of fluid passages carries the gaseous coolant in an axial direction which is opposite to that of its immediately adjacent subgroups. By alternating the flow direction in this manner, the overall temperature of the radiation shield is held fairly constant along its axial length. By utilizing helical fluid passages, as opposed to straight axial passages, the material of the radiation heat shield which is directly affected by any specific helical passage is distributed in both an axial and circumferential direction. The benefit of the present invention, during fault conditions or other abnormal operations, is that the affected material which is proximate a fluid passage which is operating abnormally is distributed in such a way so as to minimize the net distortion moment about the center of rotation of the radiation shield.

By using helical fluid passages, the present invention avoids serious imbalances which could otherwise be caused by variations in the rate of flow of coolant through different passages. By distributing the potentially affected zones of material around the radiation shield in a helical pattern, the effective net imbalance is reduced significantly and, as the number of helical turns is increased, the imbalance effect of a disturbed coolant flow through any particular fluid passage approaches zero.

BRIEF DESCRIPTION OF THE DRAWING

The present invention will be more fully understood from the following detailed description of the preferred embodiment read in conjunction with the accompanying drawing, in which.

DESCRIPTION OF THE PREFERRED EMBODIMENT

The present invention relates generally to superconducting generators and, more specifically, to a radiation shield for use in a superconducting generator which incorporates a plurality of helical cooling passages in order to reduce the deleterious mechanical affects which can be caused by a discrepancy between the rate of flow through different coolant passages.

Figure 1:
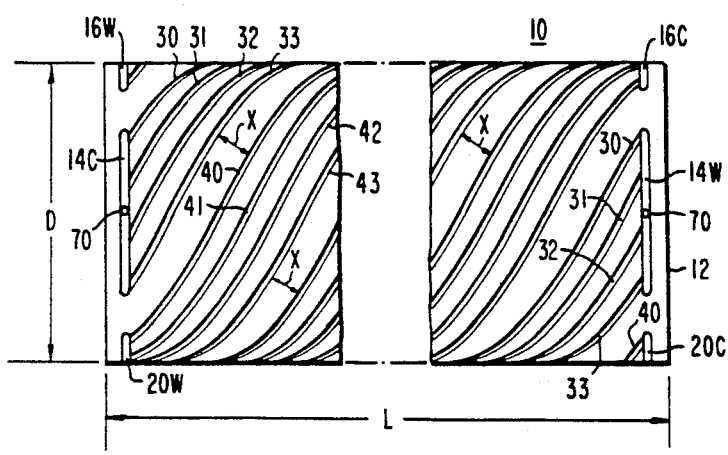
FIG. 1 shows the inner cylinder of a radiant heat shield made in accordance with the present invention.
Figure 2:
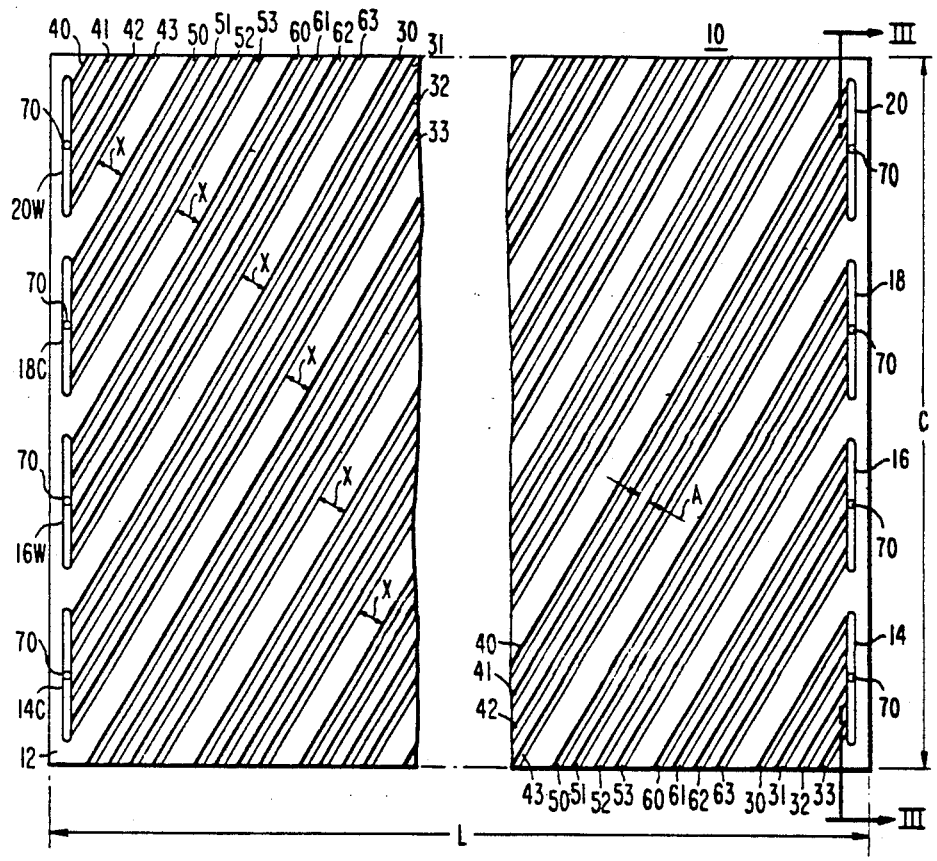
FIG. 2 illustrates an inner cylinder of the present invention in a projection view.

In FIG. 1, a radiation shield 10 made in accordance with the present invention is illustrated. It incorporates an inner cylinder 12 which is provided with a plurality of circumferential coolant passages. As discussed above, these passages consist of grooves in the outer cylindrical surface of the inner cylinder 12 which, in conjunction with an outer cylinder (reference numeral 80 in FIG. 4), from the fluid passages or conduits. In FIG. 1, the outer cylinder (reference numeral 80 in FIG. 4) is from FIG. 1 in order to expose the fluid passages and to illustrate the present invention more clearly. These circumferential coolant passages are arranged in pairs with the two passages of each pair being arranged at opposite axial ends of the radiation shield 10. For example, circumferential grooves 14C and 14W, as shown in FIG. 1, are located at opposite axial ends of the radiation shield 10 and are aligned at generally equal circumferential positions on the radiation heat shield 10. Similarly, circumferential grooves 16W and 16C are associated as a pair and circumferential grooves 20W and 20C are associated as a pair. Another pair of circumferential grooves, 18C and 18W, are not illustrated in FIG. 1 but are shown in FIG. 2. The use of the nomenclature "W" and "C" along with the reference numerals assigned to the circumferential grooves indicates whether or not the particular circumferential groove is considered a "cold" groove or a "warm" groove. It should be understood that these designations are relative and represent the differences between a "cold" groove which is at approximately 100° Kelvin and a "warm" groove which is at approximately 145° Kelvin.

As illustrated in FIG. 1, each circumferential groove is intersected by a plurality of helical fluid passages. For example, circumferential fluid passages 14C is in fluid communication with four helical fluid passages, 30–33. These same helical fluid passages, 30–33, are also in fluid communication with circumferential fluid passage 14W. Therefore, circumferential fluid passages 14C and 14W are in fluid communication with each other because of the presence of the four helical fluid passages, 30–33, which are interconnected between them. As can be seen by the illustration in FIG. 1, the helical fluid passages which are associated with a particular pair of circumferential fluid passages are disposed in a subgroup. Circumferential fluid passages 20W and 20C are similarly interconnected by four helical fluid passages, 40–43. The four helical fluid passages which connect circumferential fluid passages 20W and 20C are similarly associated in a subgroup and this subgroup is separated from adjacent subgroups by a distance indicated by the arrow X. A radiation shield made in accordance with the present invention provides for a flow of fluid coolant through each of the helical fluid passages in a subgroup in the same direction. However, adjacent subgroups carry fluid coolant in opposite helical directions. For example, a fluid coolant, such as gaseous helium, would travel from circumferential fluid passage 14C toward circumferential fluid passage 14W by way of the subgroup consisting of the helical fluid passages, 30–33. Similarly, a fluid coolant would travel from circumferential fluid passage 20C towards circumferential fluid passage 20W through the subgroup which consists of helical fluid passages 40–43.

FIG. 2 illustrates a projection view of the radiation shield 10 which was illustrated in FIG. 1. In FIG. 2, the outer cylinder (reference numeral 80 of FIG. 4) of the present invention is not shown in order to more clearly illustrate the fluid passages of the present invention. In FIG. 2, it can be seen that each pair of circumferential fluid passages (e.g. 14C and 14W) is connected by a subgroup of helical fluid passages. Each subgroup of helical fluid passages is separated from its adjacent subgroups by a dimension illustrated by arrow X and individual helical fluid passages, such as passages 40-43, are separated within a subgroup by a dimension indicated by arrow A. By varying the intergroup spacing X and the intragroup spacing A, the thermal characteristics of the radiation shield can be chosen in consideration of two independent thermal characteristics. These characteristics include the intersubgroup heat transfer which reduces cooling efficiency by essentially creating a thermal short circuit in the coolant loop and also the effective thermal inertia of each subgroup.

As is illustrated in FIG. 2, circumferential fluid passages 20W and 20C are connected by the helical fluid passages 40-43, circumferential fluid passages 18C and 18W are connected by the helical fluid passages 50-53, circumferential fluid passages 16W and 16C are connected by the helical fluid passages 60-63 and circumferential fluid passages 14C and 14W are connected by helical fluid passages 30-33. Also illustrated in FIG. 2 are the radial passages 70 which provide a means for introducing a gaseous coolant radially into the circumferential fluid passages or, alternatively, removing a fluid coolant radially from the circumferential fluid passages. The particular function of this radial fluid passage 70, as illustrated in FIG. 2, is to introduce a gaseous coolant, such as helium, in a radially outward direction into the circumferential fluid passages which are labeled with a reference numeral C and remove a gaseous coolant in a radially inward direction from the circumferential fluid passages labeled with reference numerals "W".

As discussed above, each subgroup carries a gaseous coolant in a direction opposite to that of its immediately adjacent subgroups. As an example, the subgroup which comprises helical fluid passages 50-53 carries the gaseous coolant from circumferential fluid passage 18C to circumferential fluid passage 18W (left to right in FIG. 2), whereas the subgroup which comprises helical fluid passages 40-43 and the subgroup which comprises helical fluid passages 60-63 carry gaseous coolant from circumferential fluid passages 16C and 20C toward the circumferential fluid passages 16W and 20W, respectively (from right to left in FIG. 2).

At the axial ends of the radiation shield, adjacent subgroups of helical fluid passages experience the greatest differential temperature between them. As the "cold" gaseous coolant passes through its helical fluid passage, its temperature is increased due to the transfer of heat from the cylindrical tube of the radiation shield to the coolant and the coolant is therefore warmed. As the coolant of a subgroup is gradually warmed, it flows between two adjacent subgroups whose coolant is flowing in the opposite direction. Therefore, when the coolant reaches its maximum temperature within the helical fluid passages, it is adjacent to the portions of its adjacent subgroups which are at their lowest temperature. Therefore, the intergroup space, indicated by arrow X, separates adjacent subgroups in order to reduce the quantity of heat flow between helical fluid passages which can be at considerably different temperatures. If a significant amount of heat transfer is permitted between adjacent subgroups, the coolant circuit will be essentially short circuited due to the heating of the gaseous coolant by an adjacent flow of warmer gaseous coolant.

The intragroup spacing, indicated by arrow A, is provided so that a given subgroup of helical fluid passages is spread over a sufficient area for localized heating to be dissipated by the flow of gaseous coolant. It should be apparent that, if the individual helical fluid passages of a given subgroup are spaced too close together (e.g. if the dimension indicated by arrow A is too small), the individual helical fluid passages of the subgroup will act essentially as a single fluid passage and their coverage of area will be significantly limited. As should be also apparent, these two criteria present conflicting goals and, in any specific radiation shield design, must be considered and balanced to suit the overall cooling efficiency of the radiation shield.

In order to more clearly associate FIGS. 1 and 2, the axial length of the radiant shield in both Figures is indicated by arrow L whereas the diameter of the radiant heat shield and its circumferential dimension are indicated in FIGS. 1 and 2 by arrows D and C, respectively.

Figure 3:
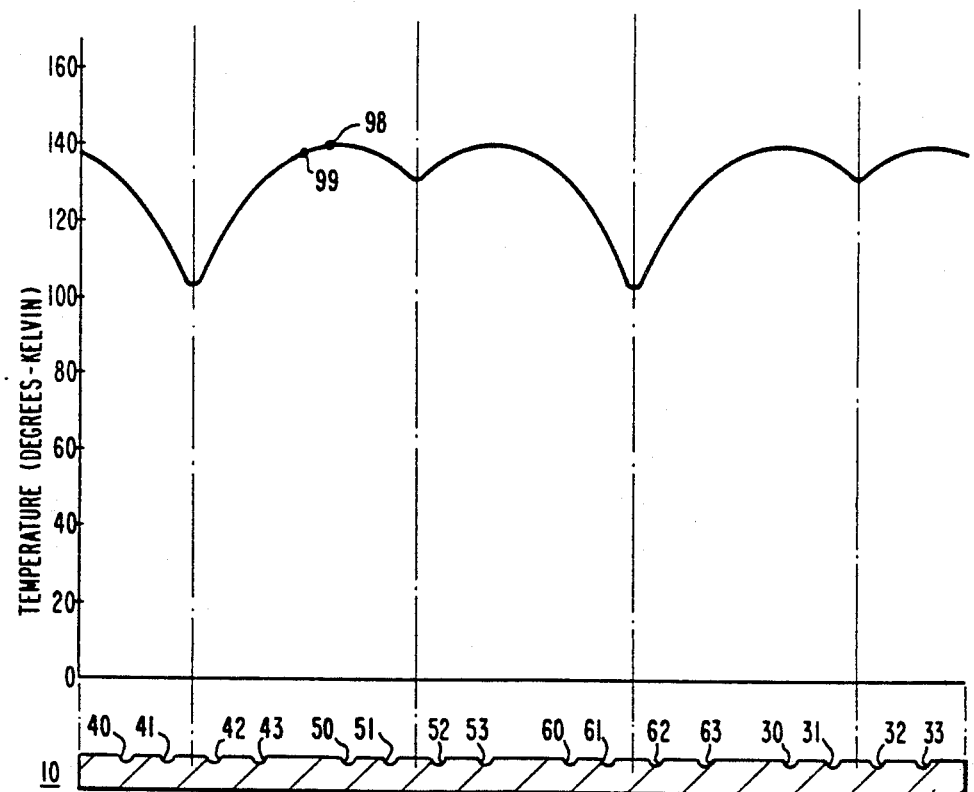
FIG. 3 is a sectional view of FIG. 2 along with a profile illustrating the temperature distribution of the present invention.

FIG. 3 illustrates a sectional view of the radiation shield illustrated in FIG. 2. The cylindrical structure 12, which is shown as a flat plate in both FIGS. 2 and 3, is illustrated with a plurality of grooves which provide the helical fluid passages discussed above. In FIG. 3, the four subgroups of helical fluid passages are shown along with a graphical representation of the approximate temperature profile of the cylinder 12 along its length. It should be understood that, although FIG. 3 illustrates the cylinder as a flat plate, it is actually cylindrical in shape as illustrated in FIG. 1. The flattening of this cylinder 12 in both FIGS. 2 and 3 is used for clarity of illustration and exemplary representation.

As can be seen in FIG. 3, the coldest portion of the radiation shield 10 is found within the subgroups comprising helical fluid passages 40-43 and 60-63. These grooves represent the helical fluid passages which are in fluid communication with circumferential fluid passages 20C and 16C in FIG. 2. As shown in the temperature graph of FIG. 3, the temperature within these two subgroups is approximately 100° Kelvin. Although the present invention is not limited to this specific temperature, it is considered typical and therefore proper for illustrative purposes. Also shown in FIG. 3, the temperature in the midst of the other two subgroups (i.e. those comprising helical fluid passages 50-53 and 30-33) are at a significantly higher temperature of approximately 138° Kelvin. These two warmer subgroups are the two subgroups which are connected in fluid communication with the circumferential fluid passages 18W and 14W, respectively. Although the temperature within the two warmer subgroups is higher than those within the colder subgroups in FIG. 3, it should be understood that the warmer subgroups do not represent the higher temperature of the radiation shield. As can be seen in the temperature graph of FIG. 3, the highest temperature of the radiation shield 10 occurs between subgroups at a point which is closer to the warm subgroups than the cold subgroups.

The thermal profile illustrated in FIG. 3 is representative of one axial end of the radiation shield. It should be understood that the opposite axial end of the radiation shield would have a temperature profile which is a reversal of the one shown in FIG. 3. This is due to the opposite directions of coolant flow in the helical fluid passages and the temperature change of the coolant as it flows from one axial end of the radiation shield to the other.

Figure 4:
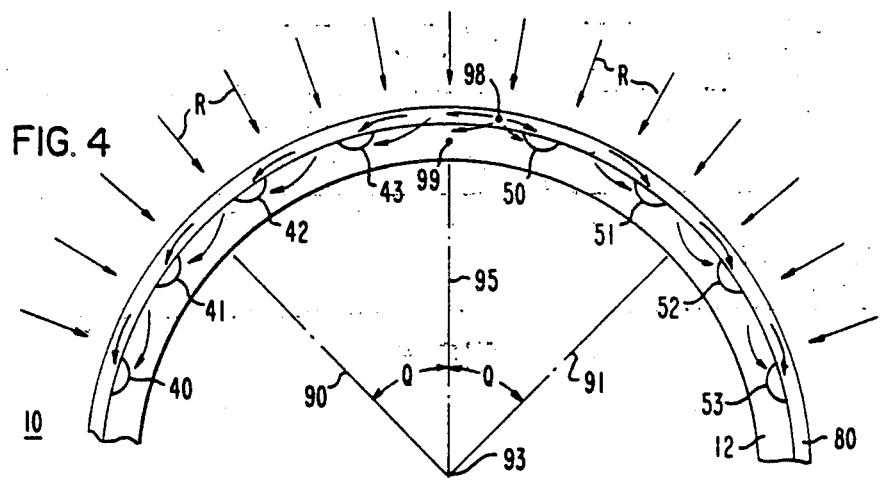
FIG. 4 is a sectional view of FIG. 1 along with an outer cylinder illustrating a typical path of thermal conduction through the present invention.

In order to more clearly illustrate why the highest temperature occurs within the intergroup gap illustrated by arrow X in FIGS. 1 and 2, FIG. 4 shows a sectional view of a radiation shield. In FIG. 4, the inner cylinder 12 is shown with a plurality of grooves machined therein which represent two subgroups. These two subgroups, chosen for illustration, are the subgroups representing helical fluid passages 40-43 and 50-53. Also shown in FIG. 4 is an outer cylinder 80 which is disposed proximate the inner cylinder 12 and which, in conjunction with the grooves which are machined in the outer cylindrical surface of the inner cylinder 12, form the helicalfluid passages of the present invention.

In FIG. 4, radiant heat is illustrated by arrows R. This radiant heat is illustrative of the type of externally propagated heat which originates in the ambient surroundings of a radiation shield and which provides the heat to which the radiation shield 10 is subjected. It is this externally propagated heat for which the radiation shield 10 is designed to remove prior to its reaching the supercooled field windings described above.

For purposes of illustration it is to be assumed that the helical fluid passages 40-43 represent a portion of that subgroup which is proximate a cold circumferential fluid passage such as 20C and the helical fluid passages 50-53 represent a subgroup which is proximate a warm circumferential fluid passage such as 18W. Lines 90 and 91 represent construction lines drawn from the center 93 of the radiation shield to the center of the two subgroups illustrated in FIG. 4. Line 95 represents a construction line drawn to the geometric center of the arc between these two subgroups. Line 95 divides the angle between lines 90 and 91 into two equal angles Q. As illustrated by the arrows passing through the inner 12 and outer 80 cylinders, radiated heat tends to flow more readily towards the "cold" subgroup than toward the "warm" subgroup. This results from the differential temperatures between the subgroups and the tendency for heat transfer to be accentuated as a function of temperature differential. For this reason, the warmest portion of the radiation heat shield illustrated in FIG. 4 would occur at point 98 and not at the center point 99 which represents the geometric center of the arc between the two illustrated subgroups.

Comparing FIGS. 3 and 4, it can be seen that the highest temperature between subgroups is found at a point 98 which is closer to the warm subgroup than to the cold subgroup. This temperature at point 98 is, of course, higher than the temperature at the geometric center between the subgroups as illustrated by point 99.

It should be apparent that the temperature at point 98 in FIG. 4 must be maintained at a value less than the maximum allowable temperature of any portion of the radiation shield. As the intergroup distance, as indicated by arrows X in FIGS. 1 and 2, is increased, the maximum value of the temperature at point 98 will also be increased for a given set of conditions. Therefore, under this criterion, it is beneficial to minimize the intergroup gap between adjacent subgroups of helical fluid passages. However, it should also be understood that, as the intergroup gap between subgroups is decreased, potential heat transfer between subgroups is also increased and the potential for thermal short circuits is exacerbated. For these reasons, it should be apparent that the physical dimensions of the intergroup gaps (indicated by arrows X) and the intragroup gaps (indicated by arrows A) must be carefully chosen to consider both of these design goals.

As discussed above, the helical nature of the fluid passages of the present invention provide a distribution of potential heat affected regions of the radiation shield around its circumference. To illustrate the advantages of the present invention, a hypothetical fault condition will be discussed. Referring to FIG. 2, if the gaseous coolant flowing from circumferential fluid passage 14C to circumferential fluid passage 14W is restricted because of a transient fault condition or some other abnormal operational fault, the region of the radiation shield which lies along the path of helical fluid passages 30-33 will experience a rise in its temperature caused by the deprivation of gaseous coolant through these helical fluid passages. This temperature rise will cause a related thermal expansion of the radiation shield proximate these nonfunctioning helical fluid passages 30-33. However, this localized expansion will extend in a helical path around the radiation shield and thus distribute itself circumferentially. The advantage of the present invention can be seen if this result is compared to the alternative result which would occur if the coolant passages extended axially between two circumferential fluid passages in a direction which is generally straight and parallel to the central axis of the radiation shield. In the latter case, all of the thermal expansion would occur on one side of the radiation shield and could form a significant distortion moment about the central axis in conjunction with its affective radial distance from the center of rotation of the radiation shield. In the present invention, this thermally expanded portion is generally distributed around the radiation shield so that these distortion moments tend to cancel each other. It should be apparent that an increased number of turns of the helical fluid passages increase this beneficial characteristic of the present invention. As the number of turns of the helical fluid passages increase toward infinity, the net imbalance caused by thermal expansion approaches zero. Limiting factors which prevent an extremely high number of turns of the helical fluid passages are the required intergroup distance (illustrated by arrows X), the width of the helical fluid passages and the length and diameter of the radiation shield itself.

Figure 5:
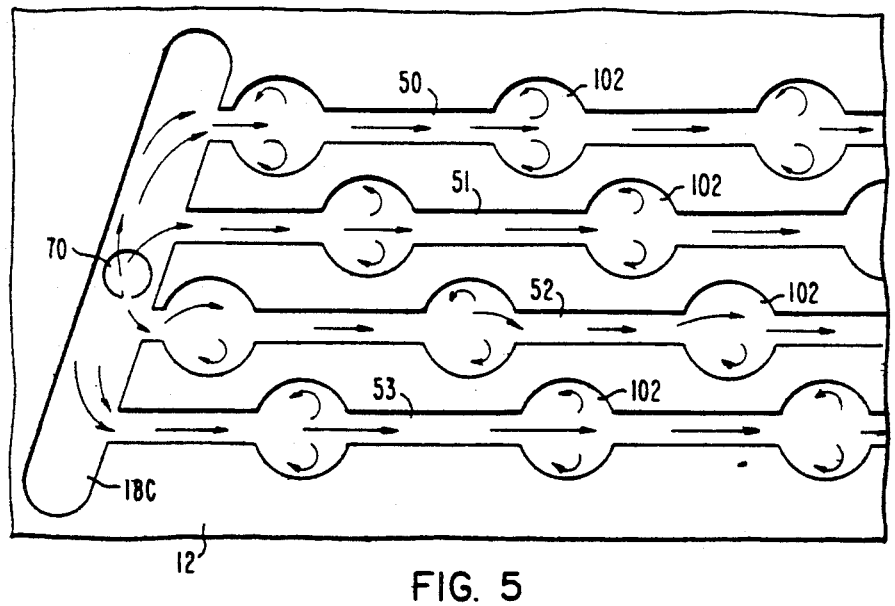
FIGS. 5 and 6 illustrate the present invention with discontinuities in its helical fluid passages.
Figure 6:
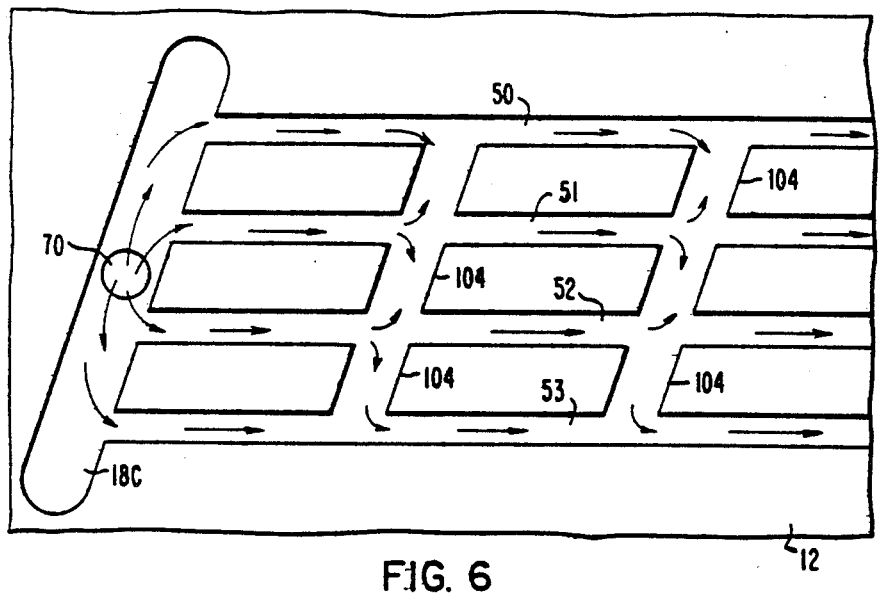

FIGS. 5 and 6 illustrate alternative embodiments of the present invention. These Figures illustrate the inclusion of discontinuities within the helical fluid passages of the present invention. The purpose of these alternative embodiments is to make the pressure drop along the helical grooves functionally dependent on the coolant's inertia instead of on the frictional characteristics of the coolant as it flows through the helical grooves. It is known to those skilled in the art that the friction experienced by a fluid flowing through a groove is a function of the fluid's viscosity and the fluid's viscosity is, in turn, a function of its temperature. Therefore, if the fluid flowing through a groove experiences a drop in its temperature, it rate of flow will be increased and the temperature of that region of the radiation shield will also be decreased leading to an unstable condition. By providing the helical grooves with discontinuities, the flow of the fluid through them becomes more significantly dependent on the fluid inertia and the overall effect of potential viscosity changes is reduced.

For illustrative purposes, FIG. 5 illustrates the circumferential groove 18C with its associated helical grooves, 50-53. In the embodiment illustrated in FIG. 5, each of the helical grooves is provided with a plurality of generally circular discontinuities. These discontinuities 120 create a turbulent flow within them and therefore causes the flow of coolant to have an inertial dependence which is more significant than its frictional dependence in determining the overall pressure drop along the length of the helical fluid passage. Although the discontinuities 102 are illustrated in FIG. 4 as being generally circular, it should be understood that the particular shape of the discontinuity 102 is not so limited. Other shapes of discontinuity, such as square or rectangular, should be considered to be within the scope of the present invention.

FIG. 6 illustrates another alternative embodiment of the present invention in which the grooves are interconnected with intergroove passages 104. These intergroove passages 104 function similarly to the discontinuities 102 which are illustrated in FIG. 5. In both FIGS. 5 and 6, the circumferential groove 18C is shown having a radial hole 70 through which a flow of coolant, such as helium, can be provided. The direction of flow of helium is illustrated by the arrows in both FIGS. 5 and 6. As illustrated, the helium flows from the radial hole 70 into the circumferential groove 18C and then into the helical grooves, 50-53. The discontinuities in the helical grooves, 50-53, create turbulent flow within the stream of coolant. Although not a requirement for the proper functioning of the present invention, the discontinuities 102 and the intergroove passages 104 which are illustrated in FIGS. 5 and 6, respectively, improve the operation of a radiation shield.

Both FIGS. 5 and 6 illustrate the inner cylinder 12 of a radiation shield with one subgroup of helical fluid passages shown for exemplary purposes. It should be understood that this alternative embodiment of the present invention does not directly interconnect one subgroup with its adjacent subgroups. The discontinuities 102 or the intergroove passages 104 are used only to improve the cooling capabilities of the fluid passages and not to affect the interrelationship between subgroups of helicalfluid passages.

The present invention provides a radiation shield which reduces potential mechanical imbalances which could be caused by transient faults or other abnormal operational modes of a superconducting generator. Although the present invention has been described in considerable detail and with specific examples, it should not be considered to be so limited. Alternative embodiments of the present invention which incorporate fluid passages which equally distribute potential thermal expansions around the circumference of a radiation shield should be considered to be within the scope of the present invention.

What we claim is:

1. A superconducting generator, comprising:
   a rotor assembly having a superconducting winding;
   a radiation shield disposed cylindrically about said rotor assembly, said radiation shield having a first circumferential fluid passage at one of its axial ends and a second circumferential fluid passage at the other of its axial ends, said radiation shield having a helical fluid passage extending around the circumference of said radiation shield, said helical fluid passage providing fluid communication between said first and second circumferential fluid passages;
   first means for introducing a fluid into said first circumferential fluid passage; and
   first means for removing a fluid from said second circumferential fluid passage.

2. The superconducting generator of claim 1, further comprising:
   a third circumferential fluid passage disposed at the same axial end of said radiation shield as said first circumferential fluid passage;
   a fourth circumferential fluid passage disposed at the same axial end of said radiation shield as said second circumferential fluid passage;
   a second helical fluid passage extending around the circumference of said radiation shield, said second helical fluid passage providing fluid communication, between said third and fourth circumferential fluid passages;
   second means for removing a fluid from said third circumferential fluid passage; and
   second fourth means for introducting a fluid into said fourth circumferential fluid passage.

3. The superconducting generator of claim 2, further comprising:
   first means for causing a fluid to flow from said first circumferential fluid passage and through said first helical fluid passage; and
   second means for causing a fluid to flow from said fourth circumferential fluid passage through said second helical fluid passage.

4. The superconducting generator of claim 3, wherein:
   said first and second helical fluid passages each extend around the circumference of fluid radiation shield at least three times.

5. The superconducting generator of claim 3, wherein:
   said first helical fluid passage comprises a first plurality of conduits within said radiation shield; and
   said second helical fluid passage comprises a second plurality of conduits within said radiation shield.

6. The superconducting generator of claim 5, wherein:
   each of said first plurality of conduits have at least one discontinuity in its surface.

7. The superconducting generator of claim 5, wherein:
   said plurality of conduits have an interconnecting channel therebetween.

8. A superconducting generator, comprising:
   a rotor assembly having a superconducting winding;
   a radiation shield disposed cylindrically about said rotor assembly, said radiation shield having a first circumferential fluid passage at one of its axial ends and a second circumferential fluid passage at the other of its axial ends, said radiation shield having a helical fluid passage extending around the circumference of said radiation shield, said helical fluid passage providing fluid communication between said first and second circumferential fluid passages;
   first means for introducing a fluid into said first circumferential fluid passage;
   first means for removing a fluid from said second circmferential fluid passage;
   a third circumferential fluid passage disposed at the same axial end of said radiation shield as said first circumferential fluid passage;
   a fourth circumferential fluid passage disposed at the same axial end of said radiation shield as said second circumferential fluid passage;
   a second helical fluid passage extending around the circumference of said radiation shield, said second helical fluid passage providing fluid communication between said third and fourth circumferential fluid passages;

second means for removing a fluid from said third circumferential fluid passage; and second fourth means for introducing a fluid into said fourth circumferential fluid passage.

9. The superconducting generator of claim 8, further comprising:

first means for causing a fluid to flow from said first circumferential fluid passage and through said first helical fluid passage; and second means for causing a fluid to flow from said fourth circumferential fluid passage through said second helical fluid passage.

10. The superconducting generator of claim 9, wherein:

said first and second helical fluid passages each extend around the circumference of said radiation shield at least three times.

11. The superconducting generator of claim 9, wherein:

said first helical fluid passage comprises a first plurality of conduits within said radiation shield; and said second helical fluid passage comprises a second plurality of conduits within said radiation shield.

12. The superconducting generator of claim 10, wherein:

each of said first plurality of conduits have at least one discontinuity in its surface.

13. The superconducting generator of claim 10, wherein:

said plurality of conduits have an interconnecting channel therebetween.

* * * * *